US010072947B1

(12) United States Patent
Mantler (10) Patent No.: US 10,072,947 B1
(45) Date of Patent: Sep. 11, 2018

(54) ASSISTED ALIGNMENT FOR WIRELESS CHARGING

(71) Applicant: Google LLC, Mountain View, CA (US)

(72) Inventor: Tony Mantler, Cupertino, CA (US)

(73) Assignee: Google LLC, Mountain View, CA (US)

(*) Notice: Subject to any disclaimer, the term of this patent is extended or adjusted under 35 U.S.C. 154(b) by 193 days.

(21) Appl. No.: 14/804,809

(22) Filed: Jul. 21, 2015

(51) Int. Cl.
| G01V 3/00 | (2006.01) |
| H02J 7/00 | (2006.01) |
| G01D 5/22 | (2006.01) |
| H02J 7/02 | (2016.01) |
| G01B 7/31 | (2006.01) |

(52) U.S. Cl.
CPC ............... *G01D 5/22* (2013.01); *G01B 7/31* (2013.01); *H02J 7/025* (2013.01); *H02J 7/027* (2013.01)

(58) Field of Classification Search
USPC ............................. 324/207.17, 652; 320/108
See application file for complete search history.

(56) References Cited

U.S. PATENT DOCUMENTS

| 7,683,572 B2* | 3/2010 | Toya ...................... H02J 7/0044 320/108 |
| 2010/0201513 A1* | 8/2010 | Vorenkamp ............. H02J 7/025 340/539.13 |
| 2013/0033224 A1 | 2/2013 | Raedy |
| 2014/0002013 A1* | 1/2014 | Kossi ...................... H02J 7/025 320/108 |
| 2014/0168012 A1* | 6/2014 | Mankowski ............ H04W 4/20 342/359 |

FOREIGN PATENT DOCUMENTS

KR 101257676 B1 * 5/2013 ............. H02J 50/10

OTHER PUBLICATIONS

Joo et al KR 101257676 "Method and Apparatus for Display of Aligment Transmitter-Receiver Wireless Charge" (English Machine Translation, Published May 2, 2013).*
Motorola, "Droid Mini User's Guide," Motorola Global Portal, retrieved on Jul. 22, 2015, retrieved from the Internet: URL<https://motorola-global-portal.custhelp.com/ci/fattach/get/675624/1377023434/redirect/1/session/L2F2LzEvdGltZS8xND15MDc0MDEzL3NpZC8qWmhvTIVqbQ==/filename/68017479001A.pdf>, 74 pages.

(Continued)

*Primary Examiner* — Farhana Hoque
(74) *Attorney, Agent, or Firm* — Fish & Richardson P.C.

(57) ABSTRACT

Techniques for visual-assisted wireless charging, including methods and systems, including machine-readable media storing executable instructions. In some implementations, a computer-implemented method includes detecting, at a mobile device that includes a wireless charging coil, electromagnetic signals from a wireless charging pad, determining, based on the detected electromagnetic signals, that the mobile device is in proximity of the wireless charging pad, determining, based on the detected electromagnetic signals, a direction to move the mobile device to align the wireless charging coil with the wireless charging pad, and in response to detecting that the mobile device is in proximity of the wireless charging pad indicating, displaying on a screen of the mobile device, (i) a location of the wireless charging coil within the mobile device, (ii) the direction to move the mobile device to align the wireless charging coil with the wireless charging pad.

20 Claims, 6 Drawing Sheets

(56) References Cited

OTHER PUBLICATIONS

MrTeMoTech™ "Ghost 100 Wireless Charging Pad," MrTeMoTech™ and Verizon Downloaded on Apr. 15, 2015, YouTube Video uploaded on Aug. 30, 2013, retrieved from the Internet: URL<http://mrtemotech.tumblr.com/post/61347147926/ghost-100-wireless-charging-pad-review>, 8 pages.
Wikipedia, "Power Matters Alliance," Jun. 8, 2015, retrieved on Jul. 22, 2015, retrieved from the Internet: URL<http://en.wikipedia.org/wiki/Power_Matters_Alliance>, 5 pages.
Wikipedia, "Qi (inductive power standard)," Jul. 16, 2015, retrieved on Jul. 22, 2015, retrieved from the Internet: URL<https://en.wikipedia.org/wiki/Qi_(inductive_power_standard)>, 5 pages.
Wikipedia, "Wireless power," Jul. 20, 2015, retrieved on Jul. 22, 2015, retrieved from the Internet: URL<https://en.wikipedia.org/wiki/Wireless_power>, 18 pages.

\* cited by examiner

ASSISTED ALIGNMENT FOR WIRELESS CHARGING

FIELD

The present specification relates to wireless inductive charging.

BACKGROUND

Users may charge electronic devices using wireless charging devices. One way to charge electronic devices includes placing a device that has a receiving coil over a wireless charging pad that transmits energy to the device.

SUMMARY

In some implementations, an electronic device can be configured to display graphics that assist the user to align the device with a wireless charging pad. For example, when the device detects signals from a charging pad, the device can display indicators to show how to move the device into the correct alignment. The device may display a graphic representing the location of a charging coil within the device, so that the user has a visual reference of which region of the device should be aligned with the transmission coil of the charging pad.

When charging electronic devices with a wireless charging pad, correctly positioning the device on the wireless charging pad can be challenging for users. For example, the location of a receiving coil within the device may not always be obvious, and the size of the device may obscure the user's view of a desired location that the device should be placed on the wireless charging pad. As a result, users may find the process of aligning a receiving coil of a device with the transmitting coil to be unpredictable or unreliable.

To assist a user to align a device, a device may include software that generates assistive visuals. The device may also include hardware sensors, which may be placed on or near the charging coils of the device, to determine the proximity to a wireless charging pad and the location of the wireless charging pad. Upon detecting this proximity, the software may display an overlay graphic on the screen to show a user the location of the receiving coil and a directional instruction to move the device to align it with the charging pad. The instruction may include visual references representing movement, such as arrows or graphical overlays.

In some instances, the sensors are auxiliary wire windings, which may be included in a device as part of one or more power receiving coils or in addition to power-receiving coils. The sensors can be used to detect how well the device is aligned with the transmitting coil, and outputs of the sensors can be used to determine which direction the device should be moved to improve alignment. Output from the sensors and/or the primary receiving coils may be used to determine the position of the device with respect to the transmitting coil, which can be indicated on the screen of the device.

In some aspects, the subject matter described in this specification may be embodied in methods that may include: detecting, at a mobile device that includes a wireless charging coil, electromagnetic signals from a wireless charging pad; determining, based on the detected electromagnetic signals, that the mobile device is in proximity of the wireless charging pad; determining, based on the detected electromagnetic signals, a direction to move the mobile device to align the wireless charging coil with the wireless charging pad; and in response to detecting that the mobile device is in proximity of the wireless charging pad indicating, displaying on a screen of the mobile device, (i) a location of the wireless charging coil within the mobile device, (ii) the direction to move the mobile device to align the wireless charging coil with the wireless charging pad.

Other versions include corresponding systems, apparatus, and computer programs, configured to perform the actions of the methods encoded on computer storage devices. A system can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other versions may each optionally include one or more of the following features. For instance, in some implementations, determining that the mobile device is in proximity of the wireless charging pad is based at least on a magnitude of output produced by the wireless charging coil in response to the electromagnetic signals from the wireless charging pad.

In some implementations, detecting the electromagnetic signals from the wireless charging pad includes detecting the electromagnetic signals with the wireless charging coil, where determining that the mobile device is in proximity of the wireless charging pad includes: determining an amount of power transfer to the wireless charging coil, and determining that the amount of power transfer to the wireless charging coil satisfies a threshold.

In some implementations, the mobile device includes auxiliary windings in addition to the wireless charging coil, where detecting the electromagnetic signals from the wireless charging pad includes detecting the electromagnetic signals with the auxiliary windings, and where determining that the mobile device is in proximity of the wireless charging pad includes determining that the mobile device is in proximity of the wireless charging pad based on a magnitude of output of the auxiliary windings produced in response to the electromagnetic signals detected by the auxiliary windings.

In some implementations, the methods may include: receiving, from one or more position sensors within the mobile device, a first signal indicative of a position of the mobile device relative to the wireless charging pad, determining, based on the first signal, a direction to move the mobile device to align the wireless charging coil with the wireless charging pad, and displaying, on the screen of the mobile device, the direction to move the mobile device to align the wireless charging coil with the wireless charging pad.

In some implementations, the methods may include: after displaying the direction and after movement of the mobile device, receiving, from the one or more position sensors of the mobile device, a second signal indicative of a second position of the mobile device relative to the wireless charging pad, determining, based on the second signal, that the receiving coil is aligned with a transmitting coil, and in response to determining that the receiving coil is aligned with the transmitting coil, displaying on the screen of the mobile device, a notification indicating that the wireless charging coil of the mobile device is aligned to the transmitting coil of the wireless charging pad.

In some implementations, each of the one or more position sensors is an auxiliary winding within the mobile device.

In some implementations, the mobile device includes four auxiliary windings spaced apart along the wireless charging coil of the mobile device, where detecting the electromagnetic signals includes detecting the electromagnetic signals with the auxiliary windings, and where determining a direction to move the mobile device to align the wireless charging coil with the wireless charging pad includes determining a direction to move the mobile device based on a magnitude of one or more signals produced by the auxiliary coils.

In some implementations, determining the direction to move the mobile device includes: determining a differential signal based on the output of at least two of the auxiliary windings, and determining the direction based on the differential signal.

In some implementations, displaying the location of the wireless charging coil within the mobile device includes displaying, on a graphical interface of the mobile device and over a location that the wireless charging coil is located within the mobile device, a shape indicating an area covered by the wireless charging coil of the mobile device.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
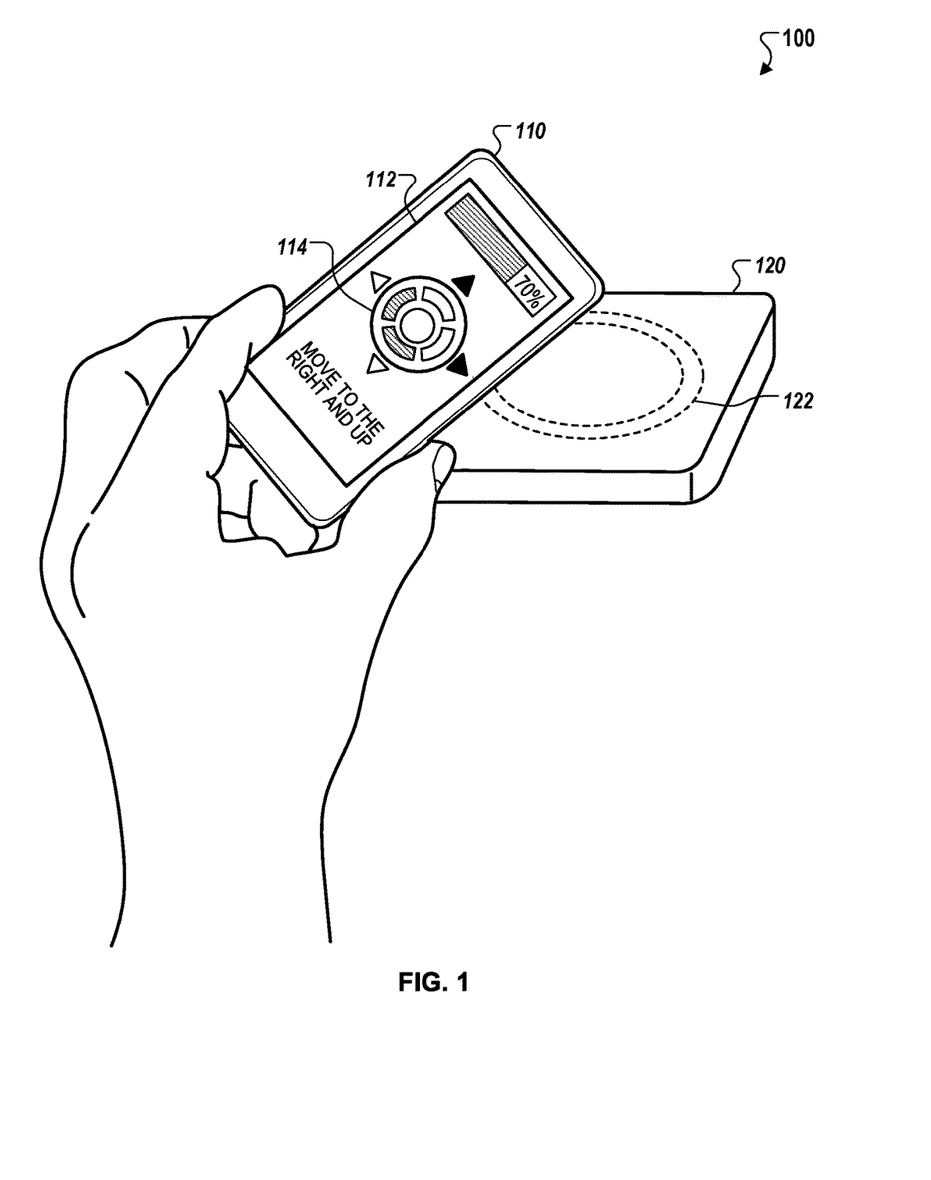
FIG. 1 illustrates an example system for assisted alignment for wireless charging.

FIG. 1 illustrates an example system 100 for assisted alignment wireless charging. The system 100 includes a device 110 including a screen 112 and a receiving coil to receive wireless power. The device 110 may be, for example, a cellular phone, a smart phone, a tablet computer, a laptop computer, a watch, a wearable computer, or any other appropriate moveable electronic device. The system 100 also includes a wireless charging pad 120 including a transmitting coil 122.

In the example shown in FIG. 1, a user places the device 110 over the wireless charging pad 120. As the device 110 approaches the wireless charging pad 120, e.g., when the device 110 is within a few inches of the wireless charging pad 120, the device 110 detects signals transmitted by the transmitting coil 122, and determines that the wireless charging pad 120 is nearby. In response to detecting the wireless charging pad 120, the device 110 displays a user interface on the screen 112 to assist the user in improving placement of the device 110 with respect to the wireless charging pad 120. In the example of FIG. 1, this user interface is provided automatically, without the user manually opening an application or requesting the user interface.

The user interface includes position indicators 114. The position indicators 114 indicate the location of the receiving coil within the device 110, which shows the user which portion of the device 110 should be aligned with the transmitting coil 122. This can be shown as if providing an "x-ray" view to the coil, and showing the shape, size and location of the receiving coil beneath the screen 112.

The position indicators 114 also include visual instructions to assist the user in positioning the device 110 on the wireless charging pad 120. For example, the position indicators 114 can include arrows, icons, symbols, or other graphics, and/or text, indicating a direction that the device 110 should be moved to improve alignment of the device 110 with the wireless charging pad 120.

The user then moves the device 110 and, in response, the device 110 detects the new position with respect to the wireless charging pad 120 and updates the position indicators 114 to provide new directions corresponding to the new position. In some implementations, the device 110 detects positions based on the transmissions from the transmitting coil 122 without using other alignment features of the wireless charging pad 120. As a result, the device 110 can provide accurate directions when used with any charging pad producing compatible charging signals, including charging pads from different third-parties that may or may not include alignment guides or alignment indicators. When the device 110 determines that charging is occurring at an acceptable rate, e.g., when power transfer above a minimum threshold occurs, the device 110 provides confirmation on the screen 112 that an appropriate alignment has been achieved. As discussed in more detail below, the screen 112 may show various types of user interfaces representing the location of the receiving coil, the transmitting coil 122, and instructions to move the device 110 during an alignment procedure.

Figure 2:
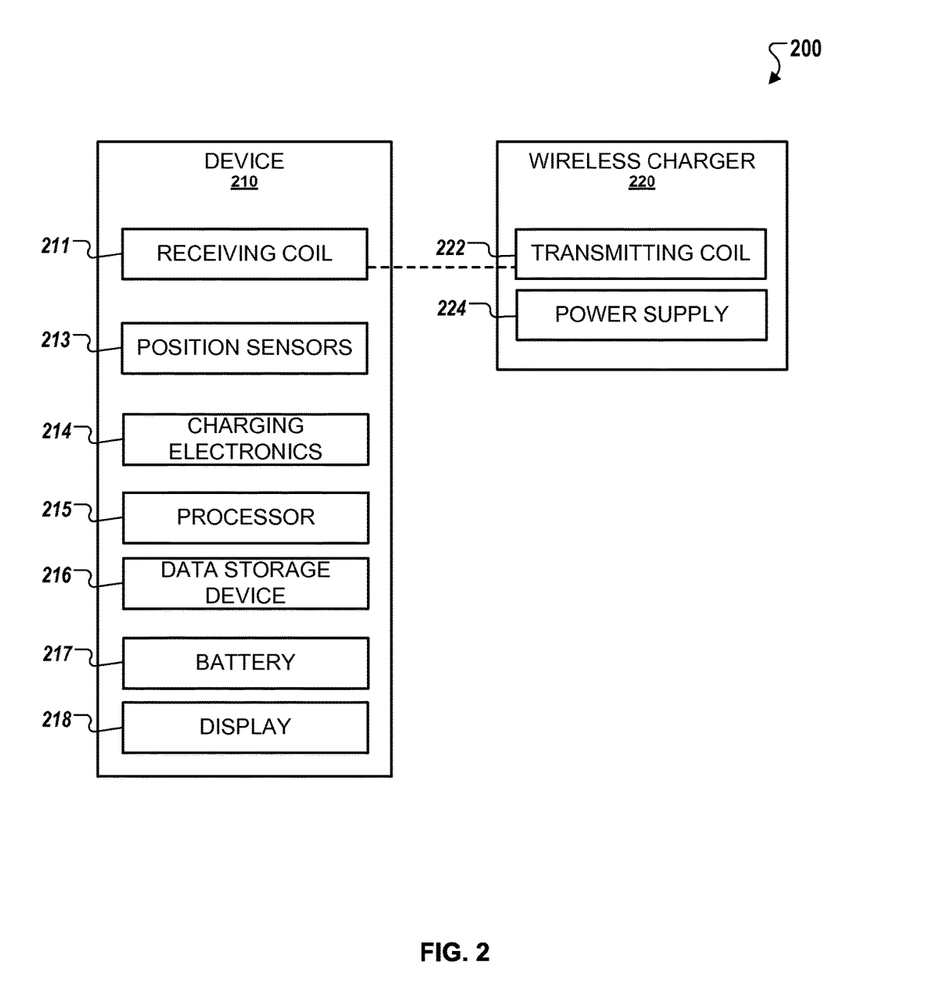
FIG. 2 is a block diagram that illustrates an example system for wireless charging.

FIG. 2 is a block diagram of an example system 200 for wireless charging. The system 200 includes a device 210 and a wireless charging pad 220. The device 210 includes a receiving coil 211, position sensors 213, charging circuitry 214, a processor 215, a data storage device 216, a battery 217, and a screen 218. The wireless charging pad 220 includes a transmitting coil 222 and a power supply 224.

In more detail, the device 210 may be any type of mobile computing device such as a smart phone, tablet computer, laptop computer, or another type of electronic device that can be charged through wireless charging.

The receiving coil 211 may be a wireless charging receiver coil on the device 210 that enables the device 210 to receive electromagnetic signals for inductive power transfer from the transmitting coil 222 of the wireless charging pad 220. For example, the receiving coil 211 may receive energy from the magnetic field generated by the transmitting coil 222 and then convert it into electrical current which may be used to charge the battery 217.

The position sensors 213 detect transmissions from the transmitting coil 222 and generate outputs that can be used to determine a position of the device 210 with respect to the transmitting coil 222. The position sensors 213 may be sensitive to magnetic fields and may be configured to produce outputs indicative of the alignment of the receiving coil 211 with the transmitting coil 222. For example, the position sensors 213 may generate data that indicates two-dimensional positions of the receiving coil 211 relative to the center of the transmitting coil 222.

In some implementations, the position sensors 213 are auxiliary windings of the receiving coil 211. In addition to a main receiving coil 211 or wire winding that obtains power for charging the device 210, multiple other coils may be included at different locations within the device 210. For example, several smaller coils may be mounted on, within, or near the receiving coil 211, for example, so that the receiving coil 211 and the auxiliary coils together form a single charging coil assembly within the device 210. The auxiliary coils may be spaced apart around the main receiving coil 211, for example, with an auxiliary coil placed at each of the four compass directions, such as 0 degrees, 90 degrees, 180 degrees, and 270 degrees. Other numbers of auxiliary coils, e.g., 3, 5, or 8 coils, and other arrangements within the device 210 and other spacings along the receiving coil 211 may also be used. In some implementations, the auxiliary coils are configured to not provide power to charge the device 210. In other implementations, the auxiliary coils may provide power to charge the device 210.

Although the main receiving coil 211 and the auxiliary windings may be formed as a single assembly, each of the coils may have separate outputs and may operate independently of the other coils. Each auxiliary coil may be located at a different fixed position within the device 210. As a result of their different positions, the auxiliary coils may detect different intensities of the fields produced by the transmitting coil 222, causing the currents induced in the different auxiliary coils to be different. By assessing the outputs of the different auxiliary coils, a position of the transmitting coil 222 relative to the device 210 may be determined.

For example, the auxiliary coil that detects the highest field strength, and thus produces the largest output, may be determined to be closest to the transmitting coil 222. In response, the device 210 can determine that the device 210 should be moved in the direction of that auxiliary coil to bring the main receiving coil 211 into better alignment with the transmitting coil 222. Other calculations can be made using the outputs of the auxiliary coils. For example, differential signals may be generated, as the difference between different pairs of outputs from the auxiliary coils.

In some implementations, when auxiliary coils spaced apart around the receiving coil 211, the auxiliary coils may be expected to produce substantially equal outputs when the receiving coil 211 is placed directly over the transmitting coil 222. The magnitudes of outputs of different sensors can be determined, e.g., R, L, U, and D, for sensors respectively placed right, left, up, and down from the center of the receiving coil 211. A differential signal or comparison of different combinations of those signals can be calculated. For example, for the quantity R−L, the magnitude can indicate whether the receiving coil 211 is placed to the right or to the left of the transmitting coil 222. If the quantity is positive, signifying that the right sensor is closer to the transmitting coil 222 than the left sensor, the device 210 can determine that it should be moved farther to the right to improve alignment. Similarly, if the quantity R−L is negative, the device 210 can determine that it should be moved to the left to improve alignment. Other differential signals, e.g., the quantity U−D, the quantity R−U, and so on, can also be computed and assessed to determine in which direction and by what amount the device 210 should be moved. In some implementations, new sensor readings are captured and assessed at regular intervals, e.g., 5, 10, or 20 times per second, to be able to provide real-time feedback to the user as the user moves the device 210.

The magnitude of the differential signals can be indicative of the distance that the device 210 should be moved to improve alignment, e.g., with larger differential signals indicating that greater movement is needed. The relationship between the differential signals or other data and the distance to be moved may be non-linear, so the device 210 can store a function, table, curve, profile that it uses to determine desired movement distances from sensor output levels.

The output of the main receiving coil 211 may also be used to determine a distance that the device 210 should be moved. Electrical outputs of the receiving coil 211, such as a current, a voltage, or rate of power transfer, may be compared with desired levels. For compatible charging pads, certain output characteristics can be known to represent certain distances from the transmitting coil. For example, a current in the receiving coil 211 that is at 20% of the current needed for full charging may correspond to a position that is two inches offset from the transmitting coil 222. A current that is 50% of the current needed for full charging may correspond to a position that is one inch offset from the transmitting coil 222. These relationships may be stored at the device 210, for example, in a function, table, curve, profile, or other data. The device 210 may use the data and the current or power levels from the receiving coil 211 to calculate a distance of the receiving coil 211 from a desired position with respect to the transmitting coil 222.

As the user moves the device 210 into alignment, the device 210 measures new outputs of the various coils and computes a new direction and distance that the device 210 should be moved. The new direction and distance are indicated on the screen 218. The device 210 also determines whether the current alignment is appropriate. For example, a measure of current or power transfer through the receiving coil 211 may be compared to a target level, and the alignment may be classified as acceptable when the measure is within a predetermined threshold of the target level, e.g., within 5% of the target, or within 20% of the target, etc. The position sensors 213 may additionally or alternatively be used to determine whether a position is acceptable. For example, a successful alignment may be detected when the sensor signals have at least a minimum magnitude and the differential signals between different sensors are less than a maximum threshold amount, indicating that the receiving coil 211 is substantially centered over the transmitting coil 222.

Other position sensors 213 may be used, in addition to or instead of auxiliary windings associated with the receiving coil 211. For example, a compass sensor of the device 210 may be used to detect the presence of the wireless charging pad 220, or to detect a direction or distance of the device 210 relative to the wireless charging pad 220.

The charging circuitry 214 may measure the power transfer from the wireless charging pad 220 to the device 210. For example, the charging circuitry 214 may measure, for instance, the charge rate of the battery or the magnitude of the power transfer to the device 210 through the receiving coil 211. In some instances, the values measured by the charging circuitry 214 may be used to determine an appropriate alignment between the receiving coil 211 and the transmitting coil 222. For example, charging values can be monitored as the device 210 is moved through different positions with respect to the wireless charging pad 220. When the power transfer or other charging measure satisfies a threshold, the device 210 can determine that the current alignment is acceptable. The charging circuitry 214 may also include elements such as a rectifier, a voltage regulator, or other components.

The battery 217 may be a portable or miniaturized energy storage device that is included in the device 210. For example, in some instances, the battery 217 may be a lithium-ion battery included within a smartphone, tablet computer, or other device 210. The battery 217 receives electrical current derived from various sources such as, for example, the receiving coil 211 or a wired power line. In some implementations, the battery 217 may be replaceable within the device 210.

The screen 218 may be an electronic visual display, such as an LCD screen, that provides visual output to a user. The screen 218 may allow a user to provide input to the device 210 through a user interface. In some instances, the screen 218 may be a touchscreen that accepts touch or multi-touch gesture user input using either fingers, a stylus, or an active digitizer.

The processor causes a user interface to be displayed on the screen 218, to indicate the position of the device 210 and instruct the user how to improve alignment with the wireless charging pad 220. The user interface may include a graphical representation of the location of the receiving coil 211 within the device 210, for example, as if to provide an "x-ray" view to show the position of the receiving coil 211 within the device 210. The representation of the receiving coil 211 may show the shape, size, and location of the receiving coil 211, for example, having an outline or edge displayed on the screen 218 directly over the actual location of the outline or edge of the receiving coil 211. The user interface may also indicate the position of the receiving coil 211 relative to the transmitting coil 222 of the wireless charging pad 220 to assist a user in moving the device 210 to align the receiving coil 211 with the transmitting coil 222 for inductive charging.

The user interface may be shown on the screen 218 to assist the user in aligning the receiving coil 211 and the transmitting coil 222. For example, as shown in FIG. 4A-4D, the user interface may be a graphical user interface that shows objects representing the displacement between position of receiving coil 211 and the optimal alignment of the receiving coil 211 with the transmitting coil 222. In some instances, the user interface may also show textual or graphical instructions to the user to move the device 210 towards the optimal alignment. For example, the user interface may show arrows indicating that the user should move the device 210 in the indicated direction to enhance the reception of electromagnetic signals produced by the transmitting coil 222. In another example, the user interface may show a text instruction, such as "MOVE THE PHONE TO THE RIGHT," which directs the user to move the device 210 in a specified direction.

The wireless charging pad 220 may be an electronic device configured to transmit electrical power from a power source to the device 210 without the use of wires or conductors. For example, the wireless charging pad 220 may produce alternating electromagnetic fields from a charging base station to transmit electrical power from a power outlet to the device 210 through inductive coupling. The wireless charging pad 220 may be a wireless charger according to the Qi interface standard or the PMA interface standard.

In some instances, the wireless charging pad 220 may be capable of using resonant inductive coupling to transmit electrical power from the transmitting coil 222 to the receiving coil 211 at a distance. In such instances, the transmitting coil 222 and the receiving coil 211 may be part of a resonant circuit tuned to resonate at the same frequency to form a resonant transformer.

In some instances, the wireless charging pad 220 may be manufactured for use with particular types of devices 210. In other instances, the wireless charging pad 220 may be a universal or standard wireless charging pad capable of operating with various devices 210. For example, the wireless charging pad 220 may operate with different types of consumer electronic devices such as smartphones, tablet computers, laptop computers, or with devices produced by different manufacturers.

The transmitting coil 222 may be an induction coil on the wireless charging pad 220. When current runs through the transmitting coil 222, the magnetic fields produced can induce current in the receiving coil 211 of the device 210. For example, the transmitting coil 222 may initially receive alternating current from the power supply 224. The transmitting coil 222 may then generate alternating magnetic fields that are detectable by the receiving coil 211 within a particular distance, e.g., one inch, three inches, five inches, etc.

The power supply 224 may be an electronic device that provides electrical energy to the transmitting coil 222. For example, the power supply 224 may supply electrical energy from a power outlet connected to the wireless charging pad 220 to internal circuitry that generates the appropriate voltages and frequencies to drive the transmitting coil 222. In some implementations, the power supply 224 may include circuitry that converts alternative current (AC) to low-voltage direct current (DC) power for the internal components of the wireless charging pad 220.

Figure 3A:
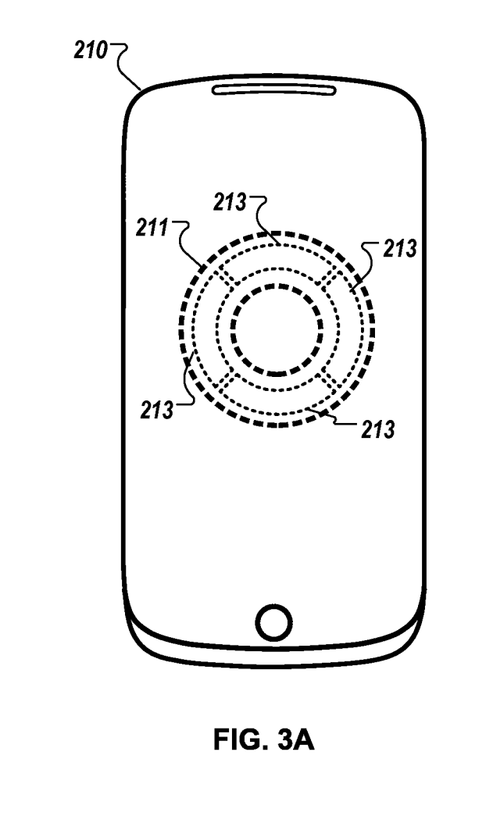
FIGS. 3A-3B illustrate examples of devices and charging coils that may be used for assisted alignment for wireless charging.
Figure 3B:
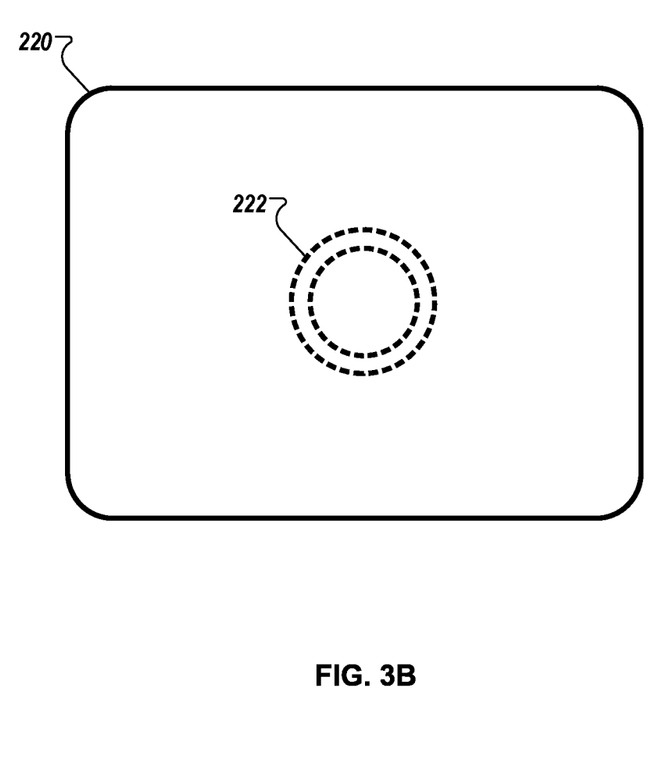

FIGS. 3A-3B illustrate examples of devices and charging coils that may be used for assisted alignment for wireless charging.

FIG. 3A shows an example of the receiving coil 211, e.g., an inductive coil within the device 210 that enables the device 210 to receive electromagnetic signals during inductive power transfer from the wireless charging pad 220. For example, the receiving coil 211 may receive energy from an alternating magnetic field generated by the transmitting coil 222 and then convert it into usable electrical current which may be used to charge the device 210, as discussed above. In some implementations, the device 210 may additionally or alternatively include multiple different receiving coils 211 configured to receive electromagnetic signals during inductive power transfer from the transmitting coil 222. The receiving coil 211 may be centered on the device 210, or may be offset from the center, e.g., shifted right or left, or up or down, from the position illustrated.

The position sensors 213 may be auxiliary windings of the receiving coil 211 and may be configured to detect the alignment of the receiving coil 211 with the transmitting coil 222. For example, the position sensors 213 may measure two-dimensional positions of the receiving coil 211 relative to the transmitting coil 222. In some implementations, the device 210 may include different position sensors 213 for detecting movement of the device 210 along different axes.

In some implementations, the position sensors 213 may also be separate from the receiving coil 211. For example, the position sensors 213 may be placed on a particular location on the device 210 such that the measurement of the two-dimensional positions of the receiving coil 211 relative to the central point of the transmitting coil 222 is determined using an alignment between the position sensors 213 and the receiving coil 211.

In other implementations, the position sensors 213 may alternatively be charging coils. For example, in such implementations the receiving coil 211 may include separate elements including the position sensors 213 as additional charging coils that receive electromagnetic signals from the transmitting coil 222.

The position sensors 213 may communicate with other components of the device 210 to convey position information about the receiving coil 211 when the device 210 is within proximity with the wireless charging pad 220. For example, the position sensors 213 may initially detect the electromagnetic signal generated by the transmitting coil 222. Position information that the processor 215 determines based on the output of the sensors 213 is displayed to the user in the user interface shown on the screen 218. For example, the user may be provided with an instruction to move the device 210 in a particular direction to increase the detected electromagnetic signal. Real-time position information about the receiving coil 211 may be detected by the position sensors 213 and transmitted to the user interface 318 for display as the user moves the device 210.

In some implementations, the user interface may show overlay graphics indicating target regions to position the device 210 to achieve an appropriate alignment between the between the receiving coil 211 and the transmitting coil 222. FIGS. 4A-4D show examples of overlay graphics representing the target region, which provides the user an on-screen visual aid during the alignment procedure.

FIG. 4A-4D are diagrams that illustrate example user interfaces. In FIGS. 4A-4D, target indicators 412, 422, 432, and 422 each indicate the location of the receiving coil 211 within the device 210. This can be a location directly over and centered on the receiving coil 211. The target indicators can also indicate the size and shape of the receiving coil 211. The target indicators 412, 422, 432, and 422 each remain in the same position on the screen 218 as the device 210 is moved, since the position of the receiving coil 211 is fixed within the device 210. Also in FIGS. 4A-4D, position indicators 414, 424, 434, and 444 indicate a position of the transmitting coil 222 of the wireless charging pad 220 relative to the device 210. As the user changes the position of the device 210 relative to the wireless charging pad 220, the position of the position indicator on the user interface also changes.

Figure 4A:
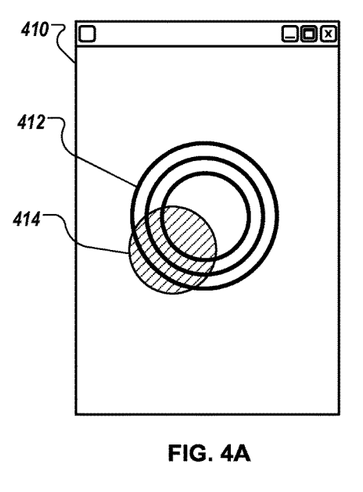
FIG. 4A-4D are diagrams that illustrate example user interfaces.

Referring now to FIG. 4A, the interface 410 includes the target indicator 412 and the position indicator 414. For example, the target indicator 412 may be a graphical overlay representing a target region of the device 210, e.g., the receiving coil 211, that the user should attempt to align with the wireless charging pad 220. The device 210 may determine the appropriate position to display the target indicator 412 based on stored information about the device 210 that indicates the position of the receiving coil 211 with respect to the screen 218. The stored information may indicate coordinates, sizes, an image, or other information indicating the position of the receiving coil 211 within the device 210.

The position indicator 414 may be a graphical representation of the current position of the transmitting coil 222 relative to the target indicator 412 that represents the receiving coil 211. For instance, as the device 210 moves, the device 210 may move the location of the position indicator 414 within the user interface based on signals received from the position sensors 213 in the device 210. The position indicator 414 is offset from the target indicator 412 to show that the device 210 is offset from the desired alignment with the wireless charging pad 220. When the user moves the device 210 so that the position indicator 414 is centered with the target indicator 412, the desired alignment will be achieved. In some implementations, the desired alignment may be a specific position of the device 210 relative to the wireless charging pad 220. In other implementations, the desired alignment may include multiple different positions, such as with the center of the receiving coil 211 located within a particular range or region of the wireless charging pad 220.

In some implementations, the location to display the position indicator 414 may be determined based on a distribution of the electromagnetic signal generated by the transmitting coil 222 measured by the position sensors 213. For example, the processor 215 of the device 210 may use output of the position sensors 213 to determine what direction and what distance the transmitting coil 222 is from the receiving coil 211. Using the magnitude of the alternating electromagnetic signals detected by the position sensors 213, the processor 215 can estimate the position of the transmitting coil 222 in a coordinate system and generate the user interface to display the position indicator 414 at that position.

In some implementations, the position indicator 414 may be shown in a size and shape that approximates the size and shape of the transmitting coil 222. For example, the device 210 may store data indicating the size and shape of a typical transmitting coil, or may infer characteristics of the charging coil from the signals detected by the position sensors 213 and/or receiving coil 211. Thus, similar to the target indicator 412, the position indicator 414 may indicate the size, shape, and location of the transmitting coil 222 as if the user had an "x-ray" view through the device 210 and the wireless charging pad 220 to see at least the outline or area of the transmitting coil 222. The position indicator 414 may provide other information, for example, being displayed in different colors, shapes, or sizes to represent different distances of the transmitting coil 222 from the receiving coil 211, different levels of power transfer to the device 210, or different levels of accuracy of the measurements of the position of the transmitting coil 222.

Figure 4B:
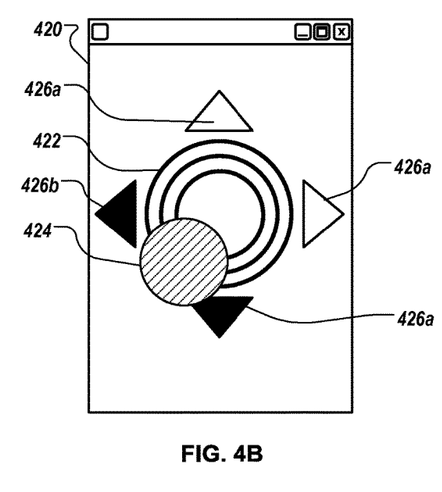

Referring now to FIG. 4B, the interface 420 shows the target indicator 422 and the position indicator 424 as described previously, and additionally, instructional graphics 426a-b. The instructional graphics 426a-b provide an instruction to a user to move the device 210 in a particular direction towards the position that will align the receiving coil 211 with the transmitting coil 222. For instance, as represented in the example, the instructional graphic 426a provides a visual indicator to the user to move the device 210 down and to the left to move the device 210 toward the location of the transmitting coil 222 indicated by the position indicator 424.

Figure 4C:
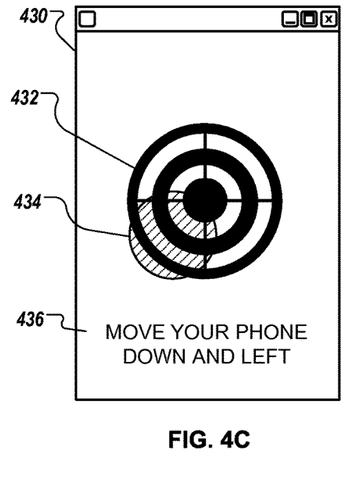

Referring now to FIG. 4C, the interface 430 shows the target indicator 432 and the position indicator 434 as discussed previously, and additionally, instructional text 436. The target indicator 432 is shown as a "bulls-eye" graphic, which may have the same shape, size, and location as the receiving coil 211 or may be shown in a different shape, size, or position from the receiving coil 211. For example, in some implementations, the target indicator 423 may be offset from the actual placement of the receiving coil 211 within the device 210. Similarly, the position indicator 434 may be shown at a location offset from the actual location of the transmitting coil 222 under the device 210. Nevertheless, the relative position of the position indicator 434 and the target indicator 432 shown may indicate the actual relative position between the device 210 and the desired location of the device with respect to the wireless charging pad 220.

The instructional text 436 may be provided in addition to, or instead of, the instructional graphic 426a-426b of FIG. 4B. The instructional text 436 indicates an action to the user to move the device 210 in a particular direction toward alignment desired alignment position between the receiving coil 211 and the transmitting coil 222.

The target indicators 422, 432 and position indicators 424, 434 in the examples of FIGS. 4B and 4C may be omitted in some implementations. Instead, directions for moving the device 210 may be provided as text or graphics instructing a direction and/or amount of movement to be made.

Figure 4D:
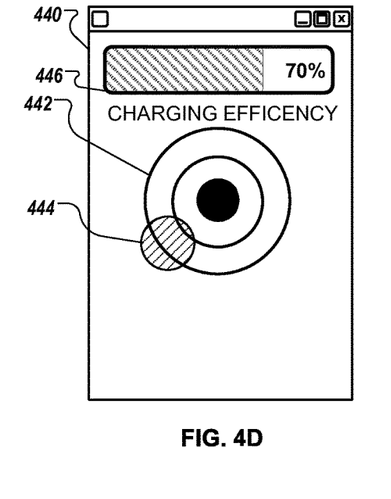

Referring now to FIG. 4D, the interface 440 may show the target indicator 442 and the position indicator 444 as discussed previously, and additionally, an alignment efficiency indicator 446. The alignment efficiency indicator 445 may be a graphical user interface element that shows the charging efficiency of the device 210 based on the current location of the device 210. As represented in the example, the charging efficiency may be "70%" if the mobile device 210 is slightly out of alignment with the wireless charging pad 220, resulting in an amount of power transfer to the receiving coil 211 that is less than a maximum desired amount.

In some implementations, the device 210 calculates the charging efficiency value to show in the alignment efficiency indicator 446 based on comparing the magnitude of the inductive current generated by the receiving coil 211 to a reference amount of inductive current, e.g., an amount that represents a maximum charging rate of the device 210 or an amount produced when the device 210 properly alignment with the transmitting coil 222.

Figure 5:
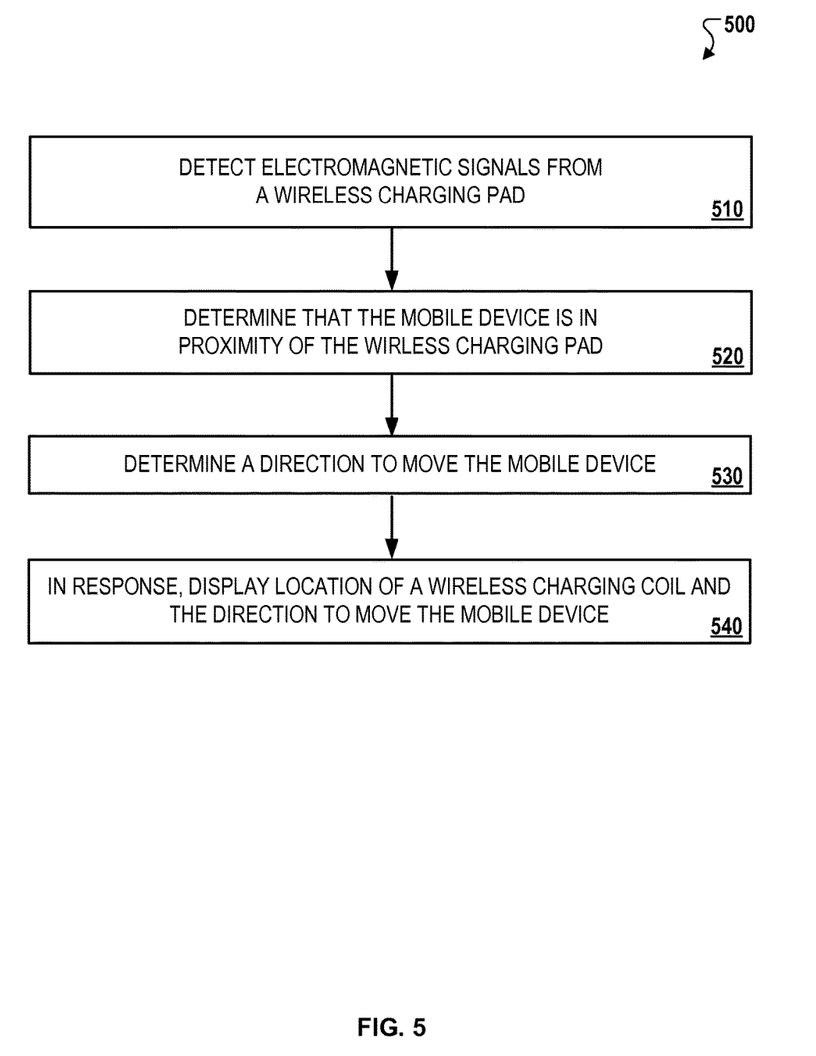
FIG. 5 is a flow diagram that illustrates an example of a process for assisted alignment for wireless charging.

FIG. 5 is a flow diagram that illustrates an example process 500 for assisted alignment for wireless charging. Briefly, the process 500 includes detecting electromagnetic signals from a wireless charging pad (510), determining that the mobile device is in proximity of the wireless charging pad (520), determining a direction to move the mobile device (530), and in response, displaying location of the wireless charging pad and direction to move the mobile device (540).

In more detail, the process 500 initially may include detecting electromagnetic signals from a wireless charging pad (510). For example, the receiving coil 211 and/or the position sensors 213 and of the device 210 may detect electromagnetic signals generated by the transmitting coils 222 of the wireless charging pad 220.

The process 500 may include determining that the mobile device is in proximity of the wireless charging pad (520). For example, the device 210 may compare the magnitude of outputs generated in response to detected electromagnetic signals to a threshold value to determine if the device 210 is in proximity of the wireless charging pad 220. For instance, if the magnitude of output of the receiving coil 211 or one or more auxiliary coils is greater than the threshold value, then the device 210 may determine that the device 210 is in proximity of the wireless charging pad 220. In other instances, if the output of a coil is below the threshold value, then the device 210 may determine that the device 210 is not in proximity of the wireless charging pad 220.

The process 500 may include determining a direction to move the mobile device to align the wireless charging coil of the mobile device with the wireless charging pad (530). For example, based on the outputs of the position sensors 213, the device 210 may initially determine a location of a desired alignment between the receiving coil 211 of the device 210 and the transmitting coil 222 of the wireless charging pad 220. For instance, in some implementations, the device 210 may determine the location of the desired alignment based on analyzing differential signals generated by different position sensors 213. For example, the device 210 may compare the differential signals indicating the outputs of different position sensors 213 to determine a direction to move the device 210. The device 210 may use the magnitude of the differential signals to determine a distance to move the device 210 in a particular direction. In instances where the distance may have a non-linear relationship with the magnitude of the differential signal, the device 210 additionally may use a reference curve or other data that equates signal levels to distances.

The process 500 may include displaying, on a screen of the mobile device, a location of the wireless charging coil within the mobile device and the direction to move the mobile device to align the wireless charging coil with the wireless charging pad (540). For example, as described previously, the location of the receiving coil 211 relative to the transmitting coil 222 may be initially determined based on differential signals generated from outputs of the position sensors 213, which may be auxiliary windings of the receiving coil 211.

The device 210 may also determine a user instruction to move the device 210 to reduce the displacement between the location of the receiving coil 211 and the transmitting coil 222. For example, based on the differential signal generated from the outputs of the position sensors 213, the device 210 may determine a particular direction to move the device 210 to increase the electromagnetic signal received by the receiving coil 211. For example, if the position sensor 213 that is located on the left side of the receiving coil 211 produces a greater output signal than the positional sensor 213 that is placed on the right side of the receiving coil, than the differential signal between the left and the right position sensors 213 indicates that the user should move the device 10 towards the left to increase the electromagnetic signal received by the receiving coil 211. The device 210 then generates the user instruction to move the device 210 to the left.

The location of the receiving coil 211 and the user instruction may be shown in the user interface of the device 210. For example, in response to generating the user instruction to move the device 210 to the right, the user interface 219 may display a graphic or text representing the user instruction. As shown in FIGS. 4A-4C, in some instances, the graphic representing the user instruction may be an arrow indicating a direction to move the device 210, or text such as "MOVE THE DEVICE TO THE RIGHT."

Figure 6:
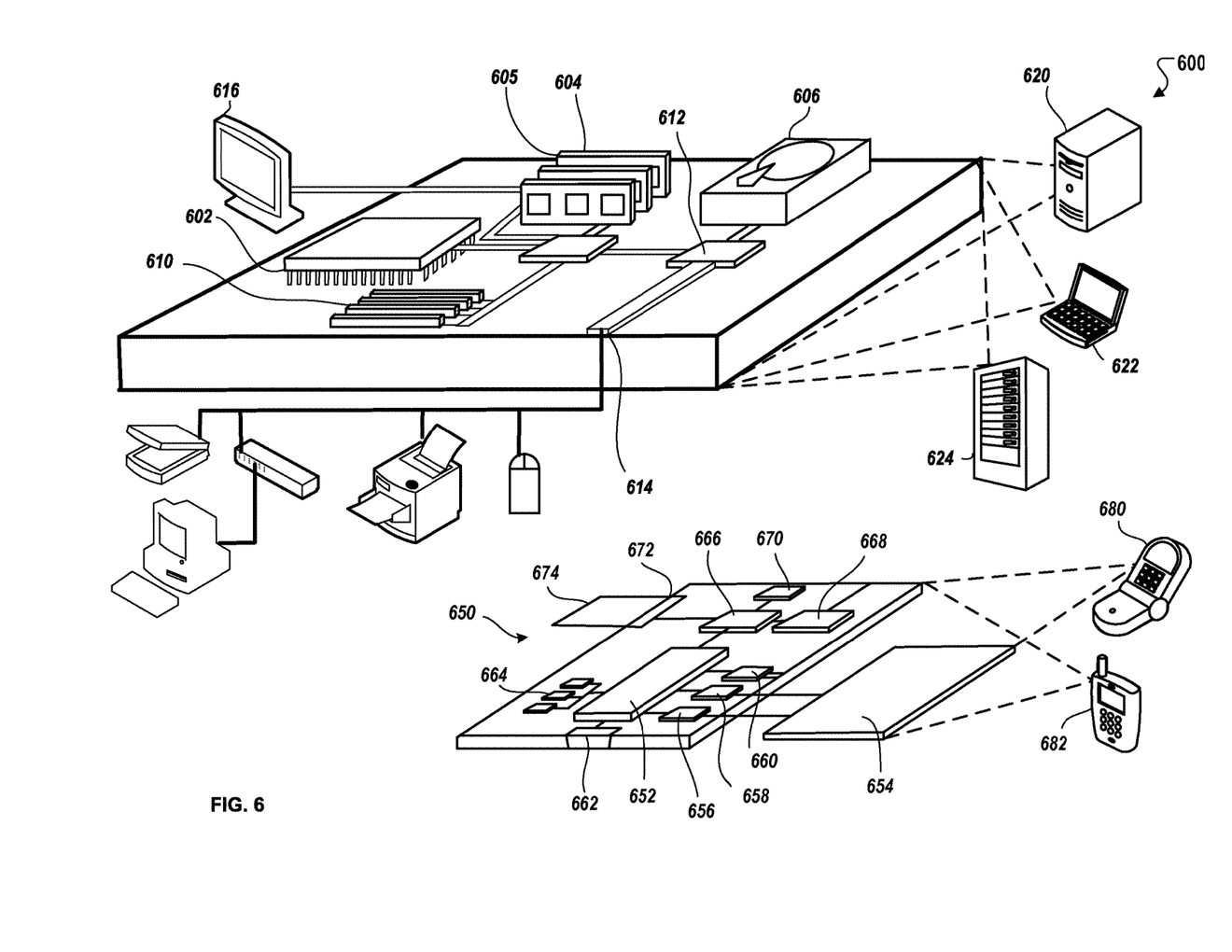
FIG. 6 is a block diagram of computing devices on which the processes described herein, or portions thereof, may be implemented.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which may accept various expansion cards (not shown). In the implementation, low-speed controller 612 is coupled to storage device 606 and low-speed bus 614 or expansion port. The low-speed expansion port, which may include various communication ports, e.g., USB, Bluetooth, Ethernet, wireless Ethernet may be coupled to one or more input/output devices, such as a keyboard, a pointing device, microphone/speaker pair, a scanner, or a networking device such as a switch or router, e.g., through a network adapter. The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, and an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound, e.g., voice messages, music files, etc. and may also include sound generated by applications operating on device 650.

The computing device 650 may be implemented in a number of different forms, as shown in the figure. For example, it may be implemented as a cellular telephone 480. It may also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more processing devices, the method comprising:
   detecting, at a mobile device that includes at least a wireless charging coil, a first auxiliary winding and a second auxiliary winding, electromagnetic signals from a wireless charging pad, wherein the first auxiliary winding and the second auxiliary winding are positioned on opposite sides of the receiving coil along an axis that intersects a position of the receiving coil on the mobile device;
   determining, based on the detected electromagnetic signals, that the mobile device is in proximity of the wireless charging pad;
   determining, for a current position of the mobile device with respect to the wireless charging pad, a charging efficiency of power transfer that occurs between the wireless charging pad and the mobile device due to the electromagnetic signals from the wireless charging pad;

generating, by the first auxiliary winding and for the current position of the mobile device with respect to the wireless charging pad, a first electrical output produced by the first auxiliary winding;

generating, by the second auxiliary winding and for the current position of the mobile device with respect to the wireless charging pad, a second electrical output produced by the second auxiliary winding;

determining a differential signal representing a difference between a magnitude of the first output produced by the first auxiliary winding and a magnitude of the second output produced by the second auxiliary winding;

determining, based on the detected electromagnetic signals and the differential signal, a direction to move the mobile device along the axis that intersects the position of the receiving coil on the mobile device to align the wireless charging coil with the wireless charging pad; and in response to detecting that the mobile device is in proximity of the wireless charging pad indicating, on a screen of the mobile device, (i) a location of the wireless charging coil within the mobile device, (ii) the direction to move the mobile device to align the wireless charging coil with the wireless charging pad, and (iii) the charging efficiency for the current position of the mobile device with respect to the wireless charging pad.

2. The method of claim 1, wherein detecting the electromagnetic signals from the wireless charging pad comprises detecting the electromagnetic signals with the wireless charging coil;
wherein determining that the mobile device is in proximity of the wireless charging pad comprises:
determining an amount of power transfer to the wireless charging coil; and
determining that the amount of power transfer to the wireless charging coil satisfies a threshold.

3. The method of claim 1, wherein the mobile device comprises auxiliary windings in addition to the wireless charging coil;
wherein detecting the electromagnetic signals from the wireless charging pad comprises detecting the electromagnetic signals with the auxiliary windings; and
wherein determining that the mobile device is in proximity of the wireless charging pad comprises determining that the mobile device is in proximity of the wireless charging pad based on a magnitude of output of the auxiliary windings produced in response to the electromagnetic signals detected by the auxiliary windings.

4. The method of claim 3, wherein the charging efficiency of the wireless charging coil is determined based on (i) an amount of power transfer to the wireless charging coil and (ii) the magnitude of output of the auxiliary windings produced in response to the electromagnetic signals detected by the auxiliary windings.

5. The method of claim 1, comprising:
receiving, from one or more position sensors within the mobile device, a first signal indicative of a position of the mobile device relative to the wireless charging pad;
determining, based on the first signal, a direction to move the mobile device to align the wireless charging coil with the wireless charging pad; and
displaying, on the screen of the mobile device, the direction to move the mobile device to align the wireless charging coil with the wireless charging pad.

6. The method of claim 5, wherein after displaying the direction and after movement of the mobile device, receiving, from the one or more position sensors of the mobile device, a second signal indicative of a second position of the mobile device relative to the wireless charging pad;
determining, based on the second signal, that the wireless charging coil is aligned with a transmitting coil of the wireless charging pad; and
in response to determining that the wireless charging coil is aligned with the transmitting coil, displaying on the screen of the mobile device, a notification indicating that the wireless charging coil of the mobile device is aligned to the transmitting coil of the wireless charging pad.

7. The method of claim 1, wherein displaying the location of the wireless charging coil within the mobile device comprises displaying, on a graphical interface of the mobile device and over a location where the wireless charging coil is located within the mobile device, a shape indicating an area covered by the wireless charging coil of the mobile device.

8. The method of claim 1, wherein:
the mobile device further comprises auxiliary windings in addition to the wireless charging coil; and
the method further comprises:
determining differences in magnitudes between outputs produced by different auxiliary windings in response to electronic magnetic signals detected by the auxiliary windings;
determining an alignment between the wireless charging pad and the mobile device based on the differences in magnitudes; and
wherein the charging efficiency is determined based on the determined alignment between the wireless charging pad and the mobile device that is determined based on the differences in magnitudes.

9. The method of claim 1, wherein indicating the direction to move the mobile device to align the wireless charging coil with the wireless charging pad on the screen of the mobile device comprises displaying text providing an instruction to a user of the mobile device to move the mobile device in the direction to move the mobile device to align the wireless charging coil with the wireless charging pad.

10. The method of claim 1, wherein:
the magnitude of the first electrical output produced by the first auxiliary coil exceeds the magnitude of the first electrical output produced by the first auxiliary coil; and
the direction to move the mobile device is a direction along the axis and towards a side of the position of the receiving coil on the mobile device that is opposite to the position of the first auxiliary coil.

11. The method of claim 1, further comprising determining an amount to move the mobile device based on the outputs of the auxiliary windings.

12. A system comprising:
one or more computers; and
a non-transitory computer-readable medium coupled to the one or more computers having instructions stored thereon, which, when executed by the one or more computers, cause the one or more computers to perform operations comprising:
detecting, at a mobile device that includes at least a wireless charging coil, a first auxiliary winding and a second auxiliary winding, electromagnetic signals from a wireless charging pad, wherein the first auxiliary winding and the second auxiliary winding are positioned on opposite sides of the receiving coil along an axis that intersects a position of the receiving coil on the mobile device;

determining, based on the detected electromagnetic signals, that the mobile device is in proximity of the wireless charging pad;

determining, for a current position of the mobile device with respect to the wireless charging pad, a charging efficiency of power transfer that occurs between the wireless charging pad and the mobile device due to the electromagnetic signals from the wireless charging pad;

generating, by the first auxiliary winding and for the current position of the mobile device with respect to the wireless charging pad, a first electrical output produced by the first auxiliary winding;

generating, by the second auxiliary winding and for the current position of the mobile device with respect to the wireless charging pad, a second electrical output produced by the second auxiliary winding;

determining a differential signal representing a difference between a magnitude of the first output produced by the first auxiliary winding and a magnitude of the second output produced by the second auxiliary winding;

determining, based on the detected electromagnetic signals and the differential signal, a direction to move the mobile device along the axis that intersects the position of the receiving coil on the mobile device to align the wireless charging coil with the wireless charging pad; and in response to detecting that the mobile device is in proximity of the wireless charging pad indicating, on a screen of the mobile device, (i) a location of the wireless charging coil within the mobile device, (ii) the direction to move the mobile device to align the wireless charging coil with the wireless charging pad, and (iii) the charging efficiency for the current position of the mobile device with respect to the wireless charging pad.

13. The system of claim 12, wherein detecting the electromagnetic signals from the wireless charging pad comprises detecting the electromagnetic signals with the wireless charging coil;

wherein determining that the mobile device is in proximity of the wireless charging pad comprises:
  determining an amount of power transfer to the wireless charging coil; and
  determining that the amount of power transfer to the wireless charging coil satisfies a threshold.

14. The system of claim 12, wherein the mobile device comprises auxiliary windings in addition to the wireless charging coil;

wherein detecting the electromagnetic signals from the wireless charging pad comprises detecting the electromagnetic signals with the auxiliary windings; and wherein determining that the mobile device is in proximity of the wireless charging pad comprises determining that the mobile device is in proximity of the wireless charging pad based on a magnitude of output of the auxiliary windings produced in response to the electromagnetic signals detected by the auxiliary windings.

15. The system of claim 12, comprising:
receiving, from one or more position sensors within the mobile device, a first signal indicative of a position of the mobile device relative to the wireless charging pad;
determining, based on the first signal, a direction to move the mobile device to align the wireless charging coil with the wireless charging pad; and
displaying, on the screen of the mobile device, the direction to move the mobile device to align the wireless charging coil with the wireless charging pad.

16. The system of claim 15, wherein after displaying the direction and after movement of the mobile device, receiving, from the one or more position sensors of the mobile device, a second signal indicative of a second position of the mobile device relative to the wireless charging pad;

determining, based on the second signal, that the wireless charging coil is aligned with a transmitting coil; and in response to determining that the wireless charging coil is aligned with the transmitting coil, displaying on the screen of the mobile device, a notification indicating that the wireless charging coil of the mobile device is aligned to the transmitting coil of the wireless charging pad.

17. A non-transitory computer storage device encoded with a computer program, the program comprising instructions that when executed by one or more computers cause the one or more computers to perform operations comprising:

detecting, at a mobile device that includes at least a wireless charging coil, a first auxiliary winding and a second auxiliary winding, electromagnetic signals from a wireless charging pad, wherein the first auxiliary winding and the second auxiliary winding are positioned on opposite sides of the receiving coil along an axis that intersects a position of the receiving coil on the mobile device;

determining, based on the detected electromagnetic signals, that the mobile device is in proximity of the wireless charging pad;

determining, for a current position of the mobile device with respect to the wireless charging pad, a charging efficiency of power transfer that occurs between the wireless charging pad and the mobile device due to the electromagnetic signals from the wireless charging pad;

generating, by the first auxiliary winding and for the current position of the mobile device with respect to the wireless charging pad, a first electrical output produced by the first auxiliary winding;

generating, by the second auxiliary winding and for the current position of the mobile device with respect to the wireless charging pad, a second electrical output produced by the second auxiliary winding;

determining a differential signal representing a difference between a magnitude of the first output produced by the first auxiliary winding and a magnitude of the second output produced by the second auxiliary winding;

determining, based on the detected electromagnetic signals and the differential signal, a direction to move the mobile device along the axis that intersects the position of the receiving coil on the mobile device to align the wireless charging coil with the wireless charging pad; and in response to detecting that the mobile device is in proximity of the wireless charging pad indicating, on a screen of the mobile device, (i) a location of the wireless charging coil within the mobile device, (ii) the direction to move the mobile device to align the wireless charging coil with the wireless charging pad, and (iii) the charging efficiency for the current position of the mobile device with respect to the wireless charging pad.

18. The non-transitory computer-readable medium of claim 17, wherein detecting the electromagnetic signals from the wireless charging pad comprises detecting the electromagnetic signals with the wireless charging coil;

wherein determining that the mobile device is in proximity of the wireless charging pad comprises:

determining an amount of power transfer to the wireless charging coil; and determining that the amount of power transfer to the wireless charging coil satisfies a threshold.

19. The non-transitory computer-readable medium of claim 17, wherein the mobile device comprises auxiliary windings in addition to the wireless charging coil;

wherein detecting the electromagnetic signals from the wireless charging pad comprises detecting the electromagnetic signals with the auxiliary windings; and wherein determining that the mobile device is in proximity of the wireless charging pad comprises determining that the mobile device is in proximity of the wireless charging pad based on a magnitude of output of the auxiliary windings produced in response to the electromagnetic signals detected by the auxiliary windings.

20. The non-transitory computer-readable medium of claim 17, comprising:

receiving, from one or more position sensors within the mobile device, a first signal indicative of a position of the mobile device relative to the wireless charging pad;

determining, based on the first signal, a direction to move the mobile device to align the wireless charging coil with the wireless charging pad; and displaying, on the screen of the mobile device, the direction to move the mobile device to align the wireless charging coil with the wireless charging pad.

* * * * *

UNITED STATES PATENT AND TRADEMARK OFFICE
CERTIFICATE OF CORRECTION

PATENT NO. : 10,072,947 B1  
APPLICATION NO. : 14/804809  
DATED : September 11, 2018  
INVENTOR(S) : Mantler Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 297 days.

Signed and Sealed this  
Twenty-third Day of April, 2019

Andrei Iancu  
*Director of the United States Patent and Trademark Office*